United States Patent Office 3,249,596
Patented May 3, 1966

---

3,249,596
FLUORINATED CYCLIC ESTERS AND POLYMERS THEREOF
Ogden R. Pierce, George A. Grindahl, and Anthony J. Butler, Midland, Mich., assignors to Dow Corning Corporation, Midland, Mich., a corporation of Michigan
No Drawing. Filed Feb. 7, 1964, Ser. No. 343,201
19 Claims. (Cl. 260—89.5)

This application relates to new fluorinated, cyclic alcohols, the acrylate esters of these alcohols, and polymers thereof. These polymers have properties similar to other polyacrylate plastics, but they exhibit added thermal stability and solvent resistance due to the large amount of fluorine that is present in the composition. Thus, they are useful for coatings and in making molded articles.

The fluorinated, cyclic alcohols of this invention have the general formula of

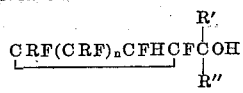

where R can be fluorine, hydrogen, or a perfluoroalkyl radical, R' and R" are lower alkyl radicals or hydrogen, and $n$ is an integer of 1 through 3.

These alcohols can be made by reacting

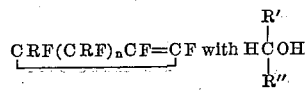

in the presence of a free radical initiator such as ditertiary butyl peroxide at a temperature above the dissociation temperature of the free radical initiator, usually about 75° C. The maximum temperature is the point where the initiator dissociates too fast, about 150° C. The alcohol adds across the double bond of the cyclofluoro-olefin, an alpha-hydrogen of the alcohol going to one olefinic carbon atom and the alcohol itself going to the other.

R can be fluorine, hydrogen, or any perfluoroalkyl radical such as trifluoromethyl, pentafluoroethyl, perfluoro-isobutyl, or perfluorooctyl.

R' and R" can be hydrogen or any lower alkyl radical such as methyl, ethyl, isobutyl, or hexyl.

The alcohols of this invention can be esterified with acrylic or methacrylic acid to form monomers from which the polymers of this invention can be made.

This esterification reaction is best done in the presence of trifluoroacetic anhydride, which is mixed with the acrylic or methacrylic acid, the alcohol then being added. The reaction temperature should be kept low, preferably below 15° C. during the mixing of the acrylic acid and the trifluoroacetic anhydride, and below 25° C. during the esterification of the alcohol. Under these conditions the trifluoroacetic anhydride does not esterify with the alcohol of this invention to any significant degree.

The esterified composition of this invention has the following formula:

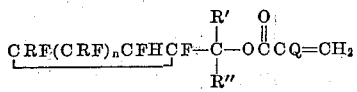

where Q is either methyl or hydrogen.

These esters polymerize in the presence of free radical generators such as ditertiary butyl peroxide, through the opening up of the double bond on each ester molecule to form long chain polymers with pendent groups, each polymer unit, therefore, being

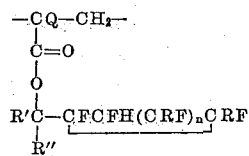

More than one species of this unit can be present in a polymer of this invention. Copolymers of the units above described are within the scope of this application.

Due to the size and high fluorine content of the pendent groups of the polymers of this invention, the superior heat-resistant properties of these polymers can be well understood.

The following examples are illustrative only and should not be construed as limiting the invention, which is properly delineated in the appended claims.

Example 1

484 g. of perfluorocyclopentene, 150 g. of anhydrous methanol, and 10 g. of ditertiary butyl peroxide were placed in an evacuated, chilled stainless steel bomb. The bomb was placed on a rocker and heated overnight at 120° C. the heat being controlled by an inside thermocouple.

The bomb was removed from the rocker, chilled, vented, and the contents fractionated.

266 g. of

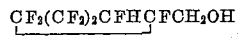

were recovered, which is 78% of the theoretical yield.

Example 2

A stainless steel bomb was evacuated, chilled, and charged with 316 g. of perfluorocyclopentene, 140 g. of absolute ethanol, and 7 g. of ditertiary butyl peroxide. The bomb was heated at 120° C. overnight.

The bomb was chilled, vented, and the contents fractionated.

A sizeable yield of

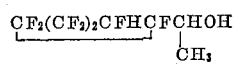

was recovered.

Example 3

Into a one liter, 3-necked flask fitted with a stirrer, addition funnel, thermometer, and reflux condenser was placed 49 g. of glacial acrylic acid. The flask was chilled to 0° C. 143 g. of trifluoroacetic anhydride was slowly added, the temperature of the flask being kept below 15° C. To this was added 165 g. of

at such a rate so as to keep the temperature of the flask below 25° C.

The flask was stirred overnight and the contents were then washed with water, followed by 200 ml. of 5% sodium hydroxide, and then the contents were again washed with water.

The product was dried and fractionated to yield

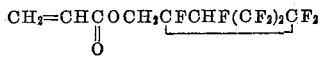

Example 4

The experiment of Example 3, was repeated using 18 g. of acrylic acid, 48 g. of trifluoroacetic anhydride, and 55 g. of

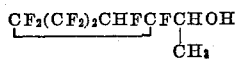

Hydroquinone and copper powder was added prior to fractionation.

A 73% theoretical yield of

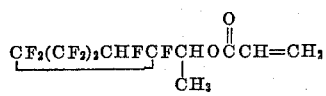

was recovered.

Example 5

The experiment of Example 3 was repeated, using 18 g. of methacrylic acid, 45 g. of trifluoroacetic anhydride, and 50 g. of

The flask was stirred about 32 hours at room temperture.

The product was washed in the manner of Example 3, and then was fractionated with a small amount of hydroquinone and copper powder.

was recovered from the fractionation.

Example 6

21 g. of

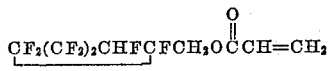

was added to a vessel containing 0.053 g. of $K_2S_2O_8$, 38 ml. of water, and 0.635 g. of sodium lauryl sulfate.

This was heated to 45° C. overnight, and then for an additional four hours at 52° C.

The product was a thermoplastic polymer that was soluble in cold acetone, consisting essentially of

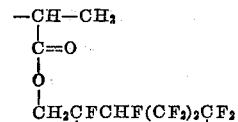

units.

Example 7

When 15 g. each of the following fluorinated cycloolefins are reacted with 10 g. each of the following alcohols in the presence of 1 g. of ditertiary butyl peroxide, the following products are formed:

| Olefin | Alcohol | Product |
| --- | --- | --- |
| $CF_2CF_2CF=CF$ | $\begin{array}{c} CH_3 \\ \diagdown \\ CHOH \\ \diagup \\ CH_3 \end{array}$ | $CF_2CF_2CHFCFCOH$ with $CH_3$, $CH_3$ |
| $C_6F_{12}CFCF_2CF=CF$ | $C_6H_{13}CH_2OH$ | $C_6F_{13}CFCF_2CHFCFCHOH$ with $C_6H_{13}$ |
| $CH_3(CF)_2CF=CF$ with $CF_3$ | $CH_3CH_2CHCH_2OH$ with $CH_3$ | $CH_3(CF)_2CFHCFCHOH$ with $CF_3$, $CHCH_2CH_3$, $CH_3$ |
| $CF_2(CF_2)_3CF=CF$ | $C_2H_5CH_2OH$ | $CF_2(CF_2)_3CFHCFCHOH$ with $C_2H_5$ |
| $CF_3CF(CFH)_3CF=CF$ | $CH_3OH$ | $CF_3CF(CFH)_3CFHCFCH_2OH$ |

Example 8

When the following fluorocycloalcohols are reacted with acrylic acid in the presence of trifluoroacetic acid anhydride, the following products are formed:

| Alcohol | Product |
| --- | --- |
| $CF_2CF_2CHFCFCOH$ with $CH_3$, $CH_3$ | $CF_2CF_2CHFCFCO-\overset{O}{\underset{\|}{C}}-CH=CH_2$ with $CH_3$, $CH_3$ |
| $C_9F_{19}CFCF_2CHFCFCHOH$ with $C_6H_{13}$ | $C_9F_{19}CF_2CF_2CHFCFCHO\overset{O}{\overset{\|\|}{C}}CH=CH_2$ with $C_6H_{13}$ |
| $CH_3(CF)_2CFHCFCHOH$ with $CF_3$, $CHCH_2CH_3$, $CH_3$ | $CH_3(CF)_2CFHCFCHO\overset{O}{\overset{\|\|}{C}}CH=CH_2$ with $CF_3$, $CHCH_2CH_3$, $CH_3$ |

Example 9

When the following fluorocycloalcohols are reacted with methacrylic acid in the presence of trifluoroacetic acid anhydride, the following products are formed:

| Alcohol | Product |
|---|---|
| $C_2F_5$<br>$\underline{CF(CF_2)_3CFH-CFCH_2OH}$<br>$\qquad\qquad\quad CH_3$ | $C_2F_5$<br>$\underline{CF(CF_2)_3CFHCFCH_2O}\overset{O}{\underset{\|}{C}}C=CH_2$<br>$\qquad\qquad CH_3\quad\ CH_3{}^*$ |
| $\underline{CF_2(CF_2)_3CFHCFCHOH}$<br>$\qquad\qquad\quad\ \dot{C}_2H_5$ | $\underline{CF_2(CF_2)_3CFHCFCH-O}\overset{O}{\underset{\|}{C}}C=CH_2$<br>$\qquad\qquad\quad\dot{C}_2H_5\quad\dot{C}H_3$ |
| $\underline{CF_3CF(CFH)_3CFHCFCH_2OH}$ | $\underline{CF_3CF(CFH)_3CFHCFCH_2O}\overset{O}{\underset{\|}{C}}C=CH_2$<br>$\qquad\qquad\qquad\qquad\qquad\dot{C}H_3$ |

Example 10

When the following esters are polymerized in the manner of Example 6, polymers are obtained which contain the following units:

| | Ester | Polymer Unit | |
|---|---|---|---|
| (a) 100% | $\underline{CF_3CF_2CHFCFCO}-\overset{O}{\underset{\|}{C}}CH=CH_2$<br>$\qquad\qquad\quad\dot{C}H_3$ | $-CH-CH_2-$<br>$\quad\ \|$<br>$\quad\ C=O$<br>$\quad\ \|$<br>$\quad\ O$<br>$\quad\ \|$<br>$CH_3\overset{\|}{C}-\underline{CFCHFCF_2CF_3}$<br>$\quad\ \|$<br>$\quad\ CH_3$ | 100% |
| (b) 100% | $\qquad\ CF_3$<br>$CH_3(\overset{\|}{C}F)_2CFHCFCHO\overset{O}{\underset{\|}{C}}CH=CH_2$<br>$\qquad\qquad\qquad\ \overset{\|}{C}HCH_2CH_3$<br>$\qquad\qquad\qquad\ \dot{C}H_3$ | $-CH-CH_2-$<br>$\quad\ \|$<br>$\quad\ C=O$<br>$\quad\ \|$<br>$\quad\ O\qquad\qquad CF_3$<br>$\quad\ \|\qquad\qquad\ \|$<br>$\quad\ CH-\underline{CFCFH(CF)_2CH_3}$<br>$\quad\ \|$<br>$CH_3CHCH_2CH_3$ | 100% |
| (c) 100% | $\ C_2F_5$<br>$\underline{CF(CF_2)_3CFHCFCH_2O}\overset{O}{\underset{\|}{C}}C=CH_2$<br>$\qquad\qquad\quad CH_3\quad\ CH_3$ | $\quad\ CH_3$<br>$\quad\ \|$<br>$-C-CH_2-$<br>$\quad\ \|$<br>$\quad\ C=O$<br>$\quad\ \|$<br>$\quad\ O$<br>$\quad\ \|$<br>$CH_3CH_2\underline{CFCFH(CF_2)_3CFC_2F_5}$ | 100% |
| (d) 100% | $\underline{CF_2(CF_2)_3CFHCFCH-O}\overset{O}{\underset{\|}{C}}C=CH_2$<br>$\qquad\qquad\quad\dot{C}_2H_5\quad\dot{C}H_3$ | $\quad\ CH_3$<br>$\quad\ \|$<br>$-C-CH_2-$<br>$\quad\ \|$<br>$\quad\ C=O$<br>$\quad\ \|$<br>$\quad\ O$<br>$\quad\ \|$<br>$C_2H_5\overset{\|}{C}H\underline{CFCFH(CF_2)_3CF_2}$ | 100% |
| (e) 10% | $\underline{CF_3CF(CFH)_3CFHCFCH_2O}\overset{O}{\underset{\|}{C}}C=CH_2$<br>$\qquad\qquad\qquad\qquad\quad\dot{C}H_3$ | $\quad\ CH_3$<br>$\quad\ \|$<br>$-C-CH_2-$<br>$\quad\ \|$<br>$\quad\ C=O$<br>$\quad\ \|$<br>$\quad\ O$<br>$\quad\ \|$<br>$\quad\ CH_2$<br>$\quad\ \|$<br>$\underline{CFCFH(CFH)_3CFCF_3}$ | 10% |
| 80% | $\underline{CF_2(CF_2)_3CFHCFCHO}\overset{O}{\underset{\|}{C}}CH=CH_2$<br>$\qquad\qquad\qquad\dot{C}H_3$ | $-CH-CH_2-$<br>$\quad\ \|$<br>$\quad\ C=O$<br>$\quad\ \|$<br>$\quad\ O$<br>$\quad\ \|$<br>$CH_3-\overset{\|}{C}H$<br>$\qquad\underline{CFCFH(CF_2)_3CF_2}$ | 80% |

| Ester | Polymer Unit |
|---|---|
| 10% $C_6F_{13}CF(CF_2)_3CFHCFCHO\overset{O}{\underset{\|}{C}}CH=CH_2$ with $C_6H_{13}$ branch | $-CH-CH_2-$ <br> $\|$ <br> $C=O$ <br> $\|$ <br> $O$ <br> $\|$ <br> $C_6H_{13}CH$ <br> $\|$ <br> $CFCHF(CF_2)_3CFC_6F_{13}$    10% |

Example 11

When 15 g. each of the following fluorinated cyclo-olefins are reacted with 10 g. each of the following alcohols in the presence of 1 g. of ditertiary butyl peroxide, the following products are formed:

| Olefin | Alcohol | Product |
|---|---|---|
| $CF_2(CF_2)_3CF=CF$ | $CH_3OH$ | $CF_2(CF_2)_3CFHCFCH_2OH$ |
| $CF_2(CF_2)_3CF=CF$ | $C_2H_5OH$ | $CF_2(CF_2)_3CFHCFCHOH$ <br> $\|$ <br> $CH_3$ |

Example 12

When the following fluorocycloalcohols are reacted with acrylic or methacrylic acid in the presence of trifluoroacetic acid anhydride, the following products are formed:

| Alcohol | Acid | Product |
|---|---|---|
| $CF_2(CF_2)_3CFHCFCH_2OH$ | Methacrylic | $CF_2(CF_2)_3CFHCFCH_2O\overset{O}{\underset{\|}{C}}C=CH_2$ with $CH_3$ |
| $CF_2(CF_2)_3CFHCFCH_2OH$ | Acrylic | $CF_2(CF_2)_3CFHCFCH_2O\overset{O}{\underset{\|}{C}}CH=CH_2$ |
| $CF_2(CF_2)_3CFHCFCH_2OH$ | Methacrylic | $CF_2(CF_2)_3CFHCFCH_2O\overset{O}{\underset{\|}{C}}C=CH_2$ with $CH_3$ |

Example 13

When compositions containing the following esters are polymerized, polymers comprising the following units are obtained.

| Ester | Polymer Unit |
|---|---|
| $CF_2(CF_2)_2CHFCFCH_2O\overset{O}{\underset{\|}{C}}C=CH_2$ with $CH_3$ | $CH_3$ <br> $\|$ <br> $-C-CH_2-$ <br> $\|$ <br> $C=O$ <br> $\|$ <br> $O$ <br> $\|$ <br> $CH_2CFCHF(CF_2)_2CF_2$ |
| $CF_2(CF_2)_2CHFCFCH_2O\overset{O}{\underset{\|}{C}}CH=CH_2$ | $-CH-CH_2-$ <br> $\|$ <br> $C=O$ <br> $\|$ <br> $O$ <br> $\|$ <br> $CH_2CFCHF(CF_2)_2CF_2$ |
| $CF_2(CF_2)_3CHFCFCH_2O\overset{O}{\underset{\|}{C}}C=CH_2$ with $CH_3$ | $CH_3$ <br> $\|$ <br> $-C-CH_2-$ <br> $\|$ <br> $C=O$ <br> $\|$ <br> $O$ <br> $\|$ <br> $CH_2CFCHF(CF_2)_3CF_2$ |
| $CF_2(CF_2)_3CHFCFCHO\overset{O}{\underset{\|}{C}}C=CH_2$ with $CH_3$ and $CH_3$ | $CH_3$ <br> $\|$ <br> $-C-CH_2-$ <br> $\|$ <br> $C=O$ <br> $\|$ <br> $O$ <br> $\|$ <br> $CH_3-CHCFCHF(CF_2)_3CF_2$ |

That which is claimed is:

1. A composition of the formula

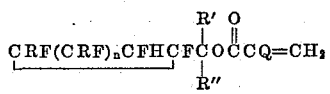

where R is selected from the group consisting of fluorine, hydrogen, and perfluoroalkyl radicals, R' and R" are each selected from the group consisting of hydrogen and lower alkyl radicals, Q is selected from the group consisting of hydrogen and methyl, and $n$ is an integer of 1 through 3.

2.

3.

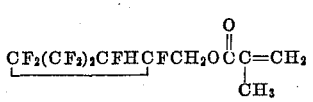

4.

5.

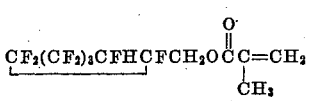

6.

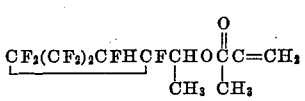

7. A polymer comprising units of the following formula

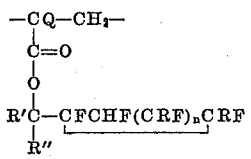

where R is selected from the group consisting of fluorine, hydrogen, and perfluoroalkyl radicals, R' and R" are each selected from the group consisting of hydrogen and lower alkyl radicals, Q is selected from the group consisting of hydrogen and methyl, and $n$ is an integer of 1 through 3.

8. A homopolymer consisting of units of the following formula

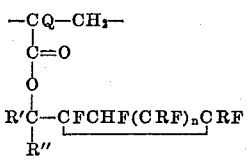

where R is selected from the group consisting of fluorine, hydrogen, and perfluoroalkyl radicals, R' and R" are each selected from the group consisting of hydrogen and lower alkyl radicals, Q is selected from the group consisting of hydrogen and methyl, and $n$ is an integer of 1 through 3.

9. A copolymer consisting essentially of at least two species of the following type of unit:

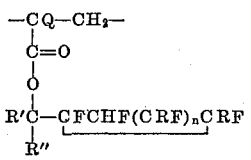

where R is selected from the group consitsing of fluorine, hydrogen, and perfluoroalkyl radicals, R' and R" are each selected from the group consisting of hydrogen and lower alkyl radicals, Q is selected from the group consisting of hydrogen and methyl, and $n$ is an integer of 1 through 3.

10. A polymer comprising units of the following formula

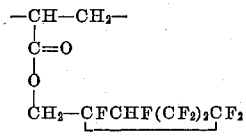

11. A polymer comprising units of the following formula:

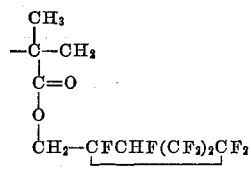

12. A polymer comprising units of the following formula:

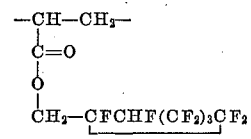

13. A polymer comprising units of the following formula:

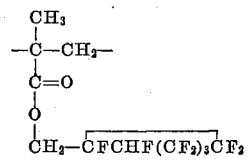

14. A polymer comprising units of the following formula:

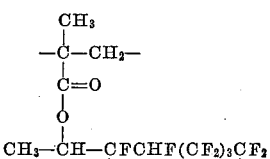

15. A homopolymer consisting of units of the following formula:

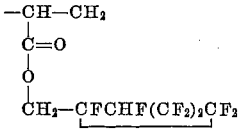

16. A homopolymer consisting of units of the following formula:

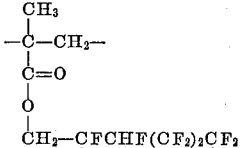

17. A homopolymer consisting of units of the following formula:

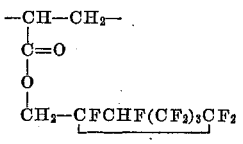

18. A homopolymer consisting of units of the following formula:
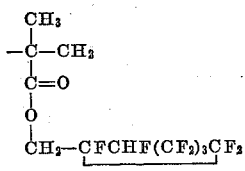
19. A homopolymer consisting of units of the following formula:
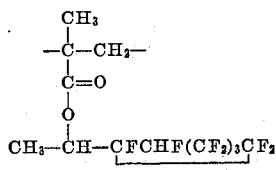
References Cited by the Examiner
UNITED STATES PATENTS
| | | | |
|---|---|---|---|
| 2,572,842 | 5/1952 | Linn | 260—617 |
| 2,597,843 | 5/1952 | Linn | 260—617 |
| 2,628,958 | 2/1953 | Bittles | 260—89.5 |
| 2,642,416 | 6/1953 | Ahlbrecht | 260—86.1 |
| 2,839,513 | 6/1958 | Ahlbrecht et al. | 260—86.1 |
| 3,025,279 | 3/1962 | Barr | 260—86.1 |
| 3,030,409 | 4/1962 | Andreades et al. | 260—617 |
JOSEPH L. SCHOFER, *Primary Examiner.*
DONALD E. CZAJA, *Examiner.*
H. WONG JR., *Assistant Examiner.*

UNITED STATES PATENT OFFICE
CERTIFICATE OF CORRECTION

Patent No. 3,249,596                                    May 3, 1966

Ogden R. Pierce et al.

It is hereby certified that error appears in the above numbered patent requiring correction and that the said Letters Patent should read as corrected below.

Column 4, line 1, the formula should appear as shown below instead of as in the patent:

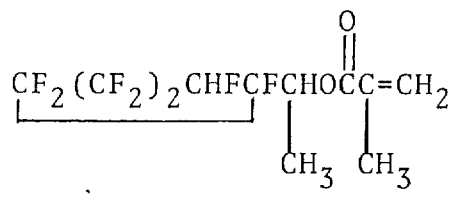

columns 5 and 6, second table, under Ester, formula (c) should appear as shown below instead of as in the patent:

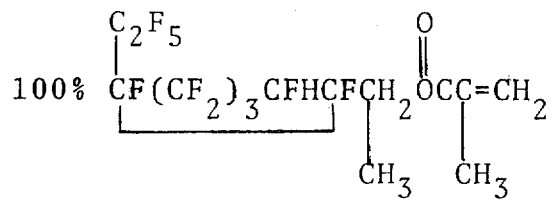

columns 7 and 8, second table, first formula under Product, the formula should appear as shown below instead of as in the patent:

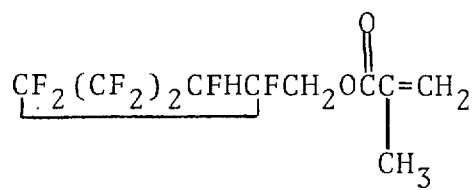

column 9, line 36, the formula should appear as shown below instead of as in the patent:

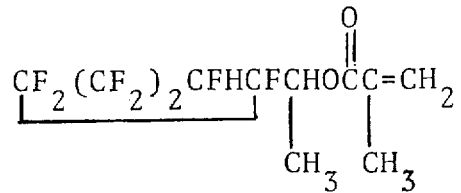

column 10, line 1, for "consitsing" read -- consisting --.

Signed and sealed this 24th day of October 1967.

(SEAL)
Attest:

EDWARD M. FLETCHER, JR.　　　　　　　　　　EDWARD J. BRENNER
Attesting Officer　　　　　　　　　　　　　Commissioner of Patents